United States Patent
Chen et al.

(10) Patent No.: US 8,444,880 B2
(45) Date of Patent: May 21, 2013

(54) YELLOW PHOSPHOR HAVING OXYAPATITE STRUCTURE, PREPARATION METHOD AND WHITE LIGHT-EMITTING DIODE THEREOF

(75) Inventors: Teng-Ming Chen, Hsinchu (TW); Chien-Hao Huang, Yunlin County (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 13/293,893

(22) Filed: Nov. 10, 2011

(65) Prior Publication Data

US 2012/0153228 A1 Jun. 21, 2012

(30) Foreign Application Priority Data

Dec. 20, 2010 (TW) ............................ 99144785 A

(51) Int. Cl.
*C09K 11/66* (2006.01)
*C09K 11/54* (2006.01)
*C09K 11/70* (2006.01)
*C09K 11/08* (2006.01)

(52) U.S. Cl.
USPC ....... 252/301.6 R; 252/301.6 F; 252/301.6 P; 252/301.4 F; 252/301.4 P

(58) Field of Classification Search
USPC ........ 252/301.4 R, 301.6 R, 301.6 S, 301.6 F, 252/301.4 S, 301.4 F
See application file for complete search history.

(56) References Cited

U.S. PATENT DOCUMENTS

| | | | | |
|---|---|---|---|---|
| 4,748,391 A | * | 5/1988 | Sigai et al. | 313/486 |
| 4,879,492 A | * | 11/1989 | Latassa et al. | 313/487 |
| 6,972,896 B2 | | 12/2005 | Feillens et al. | |
| 7,064,480 B2 | * | 6/2006 | Bokor et al. | 313/503 |
| 7,642,122 B2 | | 1/2010 | Tysoe et al. | |
| 2007/0125982 A1 | * | 6/2007 | Tian et al. | 252/301.4 F |
| 2008/0087919 A1 | | 4/2008 | Tysoe et al. | |

FOREIGN PATENT DOCUMENTS

| | | |
|---|---|---|
| EP | 0742613 | 11/1996 |
| EP | 0979883 | 2/2000 |
| EP | 1692749 | 8/2006 |
| JP | 57-109886 | 7/1982 |
| JP | 5-304331 | 11/1993 |
| JP | 2005-126577 | 5/2005 |
| JP | 2008-255315 | 10/2008 |
| JP | 2009-155369 | 7/2009 |

OTHER PUBLICATIONS

Ouenzerfi et al. 'Relationships between structural and luminescence properties in Eu3+ doped oxyphosphate-silicate apatite Ca2+xLa8−x(SiO4)6−x(PO4)xO2', 2001, Optical Materials, 16, pp. 301-310.*

(Continued)

*Primary Examiner* — Emily Le
*Assistant Examiner* — Lynne Edmondson
(74) *Attorney, Agent, or Firm* — McClure, Qualey & Rodack, LLP

(57) ABSTRACT

A yellow phosphor having oxyapatite structure, preparation method and white light-emitting diode thereof are disclosed. The yellow phosphor has a chemical formula of $(A_{1-x}Eu_x)_{8-y}B_{2+y}(PO_4)_{6-y}(SiO_4)_y(O_{1-z}S_z)_2$, wherein A and Eu are divalent metal ions, B is a trivalent metal ion, $0 < x \leq 0.6$, $0 \leq y \leq 6$, and $0 \leq z \leq 1$. A can be an alkaline earth metal, Mn or Zn. B can be a group 13 metal, a rare earth meal or Bi.

12 Claims, 13 Drawing Sheets

OTHER PUBLICATIONS

Yoshikawa et al. "Growth of Ca8La2 (PO4)6O2 Single Crystals as Substrates for GaN Epitaxial Growth", Journal of Crystal Growth 204 (1999) 302-306.

Boulon et al. "Structural and Spectroscopic Characterization of Nominal Yb3+:Ca8La2(PO4)6O2 Oxyapatite Single Crystal Fibers Grown by the Micro-Pulling-Down Method", Advanced Functional Materials 2001, 11, No. 4, August.

Han et al. "Effects R3+ on the Photoluminescent Properties of Ca2R8(SiO4)6O2:A (R=Y, La, Gd; A=Eu3+, Tb3+) Phosphor Films Prepared by the Sol-Gel Process", Journal of Physics: Condensed Matter 16 (2004) 2745-2755.

Schroeder et al. "Cation ordering in Ca2La8(SiO4)6O2"; Journal of Solid State Chemistry, vol. 26, Issue 4, Dec. 1978, pp. 383-387.

Wang et al. "Transmission electron microscopy study of ion-beam-induced amorphization of Ca2La8(SiO4)6O2"; Philosophical Magazine A, 79:1, 237-253 (1999).

Chia-Chen Wu et al. "Vacuum Ultraviolet Spectral Investigations on Green-Emitting Ca(La,Gd)4Si3O13:Tb3+ Phosphors for PDP Applications"; Journal of Rare Earths, vol. 24, Spec. Issue, Dec. 2006.

Han et al. "Sol-Gel Deposition and Luminescent Properties of Spherical Phosphors Ca2Y8(SiO4)6O2:Eu3+"; Key Engineering Materials, vols. 368-372 (2008) p. 378-380.

M. Yu et al. "Sol-gel deposition and luminescent properties of oxyapatite Ca2(Y,Gd)8(SiO4)6O2 phosphor films doped with rare earth and lead ions"; Journal of Materials Chemistry, 2002, 12, 86-91.

Lin, Jun and Su, Qiang. "A Study of Site Occupation of Eu3+ in Me2Y8(SiO4)6O2 (Me=Mg, Ca, Sr)"; Materials Chemistry and Physics, vol. 38, Issue 1, Jun. 1994, pp. 98-101.

Jun Lin and Qiang Su. "Luminescence and Energy Transfer of Rare Earth Metal Ions in Mg2Y8(SiO4)6O2"; Journal of Materials Chemistry 1995, 5 (8), 1151-1154.

Han Xiumei and Lin Jun. "Luminescence and Energy Transfer Properties of Ca2Gd8(SiO4)6O2 : A (A =Pb2+, Tm3+) Phosphors"; Journal of Rare Earths, vol. 22, No. 6, Dec. 2004, p. 825.

Han Xuimei et al. "Fabrication and Luminescence Properties of Ca2Gd8(SiO4)6O2:Er3+ Phosphors via Sol-Gel Process"; Journal of Rare Earths, vol. 24, Spec. Issue, Dec. 2006, p. 108.

Yiqiang Shen. "Synthesis and Crystal Structure Characterization of Silicate Apatite Sr2Y8(SiO4)6O2"; Journal of the American Ceramic Society, 93(4), 1176-1182 (2010).

Benli Chu. "Luminescence and energy transfer in Sr2GdxY7.9?xLn0.1(SiO4)6O2 (Ln=Sm, Dy, Eu)"; Materials Chemistry and Physics, 84 (2004) 279-283.

Hopkins et al. "Crystal Growth and Properties of CaY4(SiO4)3O, a New Laser Host for Ho3+"; Journal of Crystal Growth, vol. 10, Issue 3, Aug. 1971, pp. 218-222.

Souriau et al. "Room temperature diode pumped continuous wave SrY4(SiO4)3L: Yb3+, Er3+ Crystal Laser at 1554 nm"; Applied Physics Letters. 64, 1189 (1994); doi: 10.1063/1.110885.

English translation of abstract of JP 2009-155369 (published Jul. 16, 2009).

English translation of abstract of JP 2005-126577 (published May 19, 2005).

English translation of abstract of JP 57-109886 (published Jul. 8, 1982).

English translation of abstract of JP 2008-255315 (published Oct. 23, 2008).

Ouenzerfi et al. "Investigation of Ca0-La2O3-SiO2-P2O5 quaternary diagram. Synthesis, existence domain and characterization of apatic phosphosilicates" Solid State Ionics 156 (2003) 209-222.

\* cited by examiner

YELLOW PHOSPHOR HAVING OXYAPATITE STRUCTURE, PREPARATION METHOD AND WHITE LIGHT-EMITTING DIODE THEREOF

CROSS-REFERENCE TO RELATED APPLICATION

This application claims the priority benefit of Taiwan application serial no. 099144785, filed Dec. 20, 2010, the full disclosure of which is incorporated herein by reference.

BACKGROUND

1. Technical Field

The disclosure relates to a yellow phosphor. More particularly, the disclosure relates to a novel yellow phosphor having oxyapatite structure for solid-state lighting application.

2. Description of Related Art

Since the invention of blue light-emitting InGaN-based chip in the early 20$^{th}$ century, remarkable progress have been made in the development of commercially realized efficient white light-emitting diodes (WLEDs). By the combination of blue emission from the InGaN-based chips and yellow emission based upon the downconversion of $Y_3Al_5O_{12}:Ce^{3+}$ (YAG:Ce)-based phosphors, the generated white light has already exceeded that of incandescent lamps and is competitive with conventional fluorescent lamps. WLEDs are energy-efficient, life-durable, and environment-friendly in comparison to the conventional light sources. However, the color quality of WLEDs still requires improvement with respect to the white hue tunability, color temperature, and color rendering. In particular, these properties are closely correlated to the general illumination.

For most of the currently applied phosphors in WLEDs system, they do not reach the optimal requirements for white light and show poor color rendition in red spectral region. Therefore, to find a suitable luminescent material for phosphor converted WLEDs (pc-WLEDs) is important to attain the optical requirements for white light.

SUMMARY

In one aspect, the present invention is directed to a yellow phosphor having oxyapatite structure and a chemical formula of $(A_{1-x}Eu_x)_{8-y}B_{2+y}(PO_4)_{6-y}(SiO_4)_y(O_{1-z}S_z)_2$, wherein A and Eu are divalent metal ions, B is a trivalent metal ion, $0 \leq x \leq 0.6$, $0 \leq y \leq 6$, and $0 \leq z \leq 1$. A can be a rare earth metal, Mn, or Zn. B can be a group 13 metal, a rare earth metal, or Bi.

According to an embodiment, the chemical formula is $(A_{1-x}Eu_x)_8B_2(PO_4)_6O_2$ when both y and z are zero.

According to another embodiment, the chemical formula is $(A_{1-x}Eu_x)_2B_8(SiO_4)_6O_2$ when y is 6 and z is zero.

According to yet another embodiment, the chemical formula is $(A_{1-x}Eu_x)_8B_2(PO_4)_6S_2$ when y is zero and z is 1.

According to yet another embodiment, the chemical formula is $(A_{1-x}Eu_x)_2B_8(SiO_4)_6S_2$ when y is 6 and z is 1.

In another aspect, this invention directs to a white-light emitting diode (WLED) comprising a blue light phosphor and the yellow phosphor above.

In yet another aspect, this invention also directs to a method of preparing the yellow phosphor above. The method comprises the following steps.

Stoichiometric amounts of raw materials for required elements of the yellow phosphor are weighed. The raw materials of the metals in the yellow phosphor is metal oxide or metal carbonate, the raw material of the phosphate in the yellow phosphor is $(NH_4)_2HPO_4$ or $(NH_4)H_2PO_4$, the raw material of the silicate in the yellow phosphor is silicon oxide, and the raw material of the sulfur in the yellow phosphor is sulfur powder. The weighed raw materials are then uniformly mixed. Next, the mixed raw materials are calcined in an environment containing oxygen at a temperature of 1200-1400° C. till a product having a pure oxyapatite phase is obtained. Finally, $Eu^{3+}$ of the calcined product is reduced to $Eu^{2+}$ in an $NH_3$ atmosphere at a temperature of 900-1200° C. to obtain the yellow phosphor above.

According to an embodiment, the calcined product can be further homogenized before the reducing step.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

DETAILED DESCRIPTION

Figure 1:
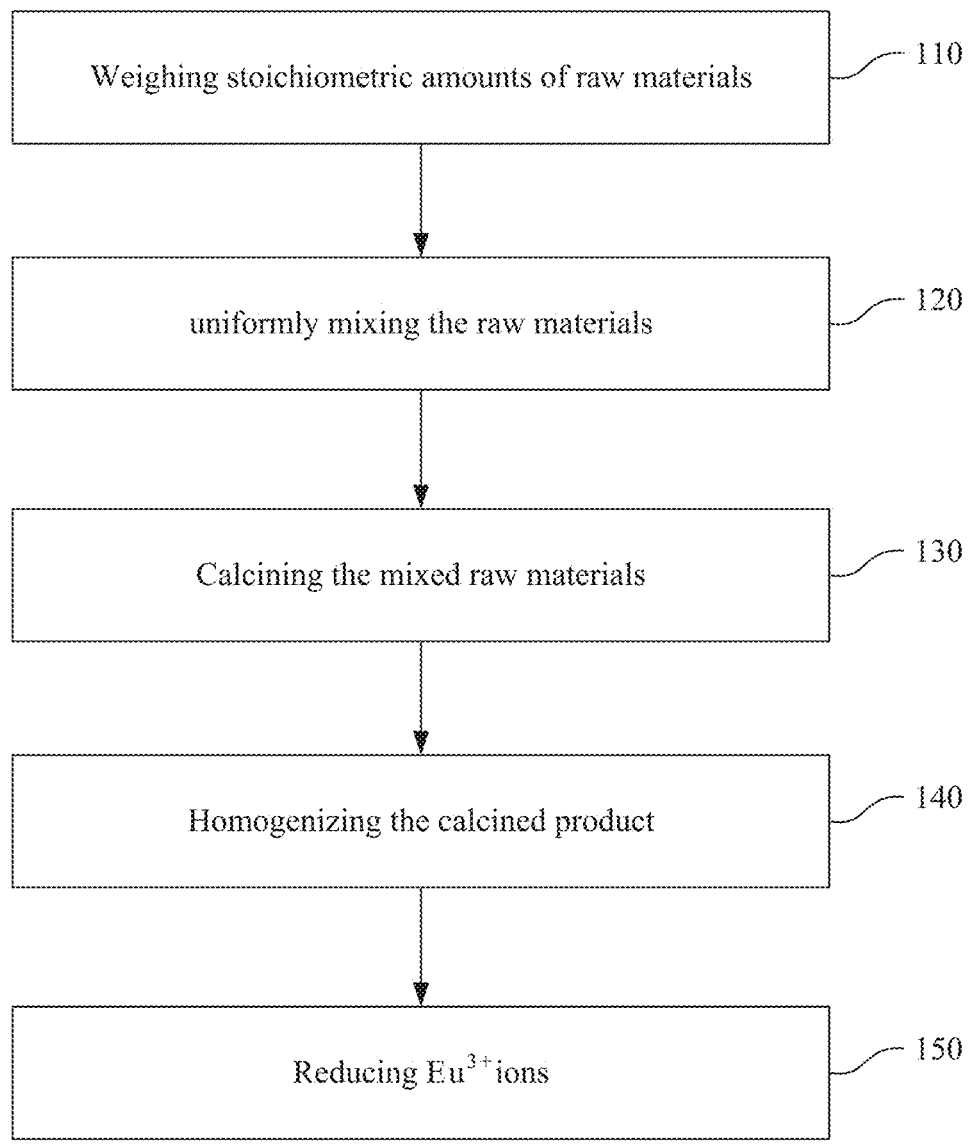
FIG. 1 is a flow diagram of preparing the yellow phosphor having oxyapatite structure.
Figure 2:
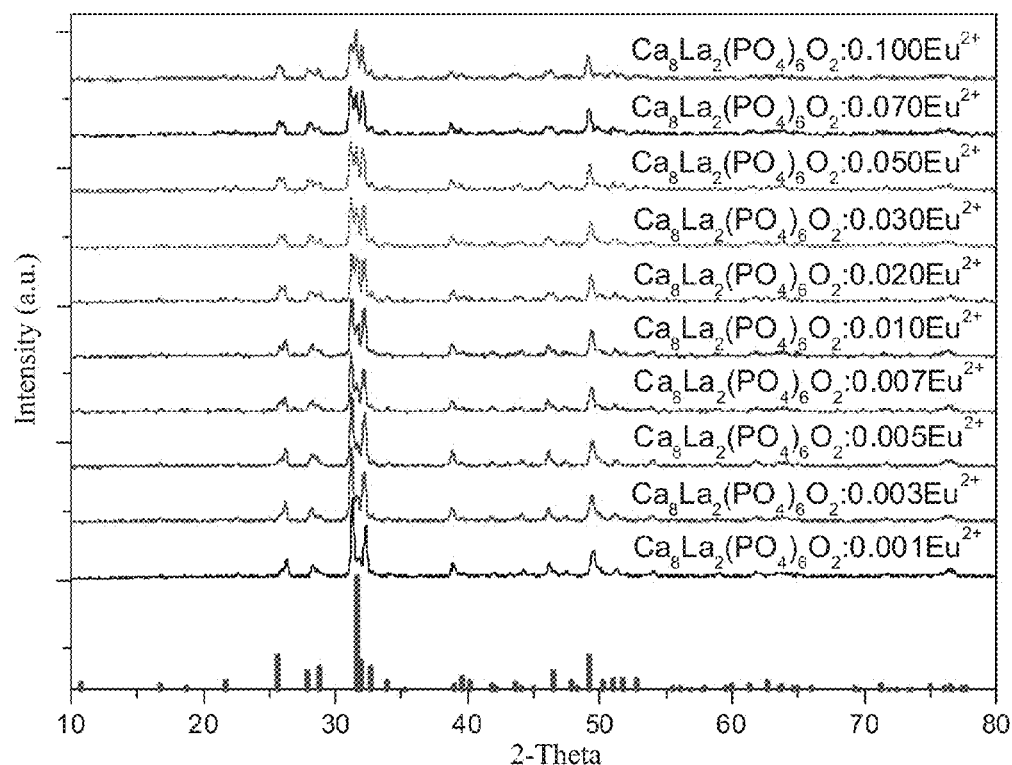
FIGS. 2-5 are XRD, excitation, emission and UV-Vis diffuse reflectance spectrum of $(Ca_{1-x}Eu_x)_8La_2(PO_4)_6O_2$.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Europium (Eu) is a lanthanoid and commonly forms divalent compounds, since Eu(II) has a relative stable configuration 4f$^7$. The excitation and emission spectrum of Eu(II) are both broad band. Thus, Eu(II) has been widely applied on light-emitting diodes. The color of the emitted light depends on crystal structure of the Eu divalent compounds and usually is toward blue. However, the excitation and emission spectrum of Eu(III) are both linear. Thus, phosphor applications of Eu(III) is limited.

In photoluminescence, apatite is an effective host. Many oxyapatites containing various rare earth metals have been synthesized. The oxyapatites have a chemical formula of $Ca_8M_2(PO_4)_6O_2$, wherein M is a trivalent rare earth metal ion. The series of $Ca_8M_2(PO_4)_6O_2$ can emit various wavelengths of light, such as visible light or near infra red light, by using various trivalent rare earth metal ions.

Furthermore, the phosphate ions of the above oxyapatites can be partially to totally replaced by silicate ions. The structure is called silicate oxyapatite when the phosphate ions in the oxyapatite are completely replaced by silicate ions to have the chemical formula of $Ca_2M_8(SiO_4)_6O_2$, wherein M is a trivalent rare earth metal ion to be responsible for emitting light. In $Ca_2M_8(SiO_4)_6O_2$, six $Ca^{2+}$ are replaced by six $M^{3+}$ to balance the six negative charges increased by the six silicate ions.

Yellow Phosphor Having Oxyapatite Structure

A yellow phosphor having oxyapatite structure is provided. The yellow phosphor has a chemical formula of $(A_{1-x}Eu_x)_{8-y}B_{2+y}(PO_4)_{6-y}(SiO_4)_y(O_{1-z}S_z)_2$. A and Eu are divalent cations to replace the $Ca^{2+}$ in the oxyapatite structure above. A can be a rare earth metal, Zn, or Mn. B is a trivalent metal cation to replace the rare earth metal cation in the oxyapatite structure above. B can be a group 13 metal, a rare earth metal, or Bi, wherein the group 13 metal can be Al, Ga, or In, the rare earth metal can be Sc, Y, or a lanthanoid, such as La, Ce, Pr, Nd, Pm, Sm, Eu, Gd, Tb, Dy, Ho, Er, Tm, Yb, or Lu. In the chemical formula above, the values of x, y, and z are $0<x\leq0.6$, $0\leq y\leq6$, and $0\leq z\leq1$, respectively. The phosphate ions and the silicate ions occupy the same sites in the oxyapatite crystal structure, and O and S also occupy the same site in the oxyapatite crystal structure.

In some special conditions, the chemical formula of $(A_{1-x}Eu_x)_{8-y}B_{2+y}(PO_4)_{6-y}(SiO_4)_y(O_{1-z}S_z)_2$ can be simplified. Please see Table 1.

TABLE 1

Yellow phosphors having oxyapatite structure.

| y | z | Chemical formula | structure |
|---|---|---|---|
| 0 | 0 | $(A_{1-x}Eu_x)_8B_2(PO_4)_6O_2$ | oxyapatite |
| 0-6 | 0 | $(A_{1-x}Eu_x)_{8-y}B_{2+y}(PO_4)_{6-y}(SiO_4)_yO_2$ | Phosphate ions partially replaced by silicate ions |
| 6 | 0 | $(A_{1-x}Eu_x)_2B_8(SiO_4)_6O_2$ | Silicate oxyapatite |
| 0 | 1 | $(A_{1-x}Eu_x)_8B_2(PO_4)_6S_2$ | oxyapatite |
| 0-6 | 1 | $(A_{1-x}Eu_x)_{8-y}B_{2+y}(PO_4)_{6-y}(SiO_4)_yS_2$ | Phosphate ions partially replaced by silicate ions |
| 6 | 1 | $(A_{1-x}Eu_x)_2B_8(SiO_4)_6S_2$ | Silicate oxyapatite |

Since some literatures divide the element number in the chemical formula $Ca_8M_2(PO_4)_6O_2$ of the above oxyapatite to obtain the simplified chemical formula of $Ca_4M(PO_4)_3O$. Therefore, the chemical formulas of the above yellow phosphors can also be simplified by the same way. The simplified chemical formula can be expressed as $(A_{1-x}Eu_x)_{4-d}B_{1+d}(PO_4)_{3-d}(SiO_4)_d(O_{1-z}S_z)$, wherein the values of x and z are the same as above ($0\leq x\leq 0.6$ and $0\leq z\leq 1$), and the value of d is $0\leq d\leq 3$.

Preparation Method of the Yellow Phosphors Having Oxyapaptite Structure

A preparation method of the yellow phosphor having oxyapatite structure is provided. FIG. 1 is a flow diagram of preparing the yellow phosphor having oxyapatite structure.

In step 110 of FIG. 1, according to the chemical formula of the desired yellow phosphor to respectively weigh stoichiometric amounts of raw materials. For metal ions of Eu, A, and B, corresponding metal oxides or metal carbonates can be the sources. For example, calcium oxide or calcium carbonate can be the sources of Ca ion. $Eu_2O_3$ can be the source of Eu(II/III) ions. As for phosphoate ions, $(NH_4)_2HPO_4$ or $(NH_4)H_2PO_4$ can be the sources. For silicate ions, silicon oxide can be the source. For sulfur, sulfur powder can be the source.

In step 120, the required raw materials are uniformly mixed by a method such as grinding. In step 130, the mixed raw materials are calcined under an atmosphere containing oxygen, such as air, at a temperature of 1200-1400° C. until a product having pure oxyapatite crystal phase is obtained. Since the calcination is performed in an environment containing oxygen, the Eu ions in the calcined product are all Eu(III). Therefore, Eu(III) occupying the Ca(II) sites in the oxyapatite structure needs to be reduced to Eu(II).

In step 140, the calcined product is homogenized again to more completely reduce the Eu(III) and increase the reduction rate of the following reduction reaction. The calcined product can be grinded again, for example. In step 150, the homogenized product is then reduced under ammonia atmosphere at a temperature of 900-1200° C. for about 10 hours.

Embodiment 1

$Ca_8La_2(PO_4)_6O_2$ Doped with Various Amounts of Eu(II)

First, $Ca_8La_2(PO_4)_6O_2$ was doped with various amounts of $Eu^{2+}$ to replace $Ca^{2+}$, to form a series of $(Ca_{1-x}Eu_x)_8La_2(PO_4)_6O_2$ (noted as $Ca_8La_2(PO_4)_6O_2$:$xEu^{2+}$ in this embodiment). The related photoluminescence properties were observed. In the chemical formula $(A_{1-x}Eu_x)_{8-y}B_{2+y}(PO_4)_{6-y}(SiO_4)_y(O_{1-z}S_z)_2$ of this embodiment, $A^{2+}$ is $Ca^{2+}$, $B^{3+}$ is $La^{3+}$, and y=z=0, and x is 0, 0.001, 0.003, 0.005, 0.007, 0.010, 0.020, 0.030, 0.050, 0.070, and 0.100.

FIGS. 2-5 are XRD, excitation, emission and UV-Vis diffuse reflectance spectrum of $(Ca_{1-x}Eu_x)_8La_2(PO_4)_6O_2$. From XRD spectrum in FIG. 2, it can be known that the crystal structure of $Ca_8La_2(PO_4)_6O_2$ is unchanged until 10 mol % doping amount of $Eu^{2+}$.

Figure 3:
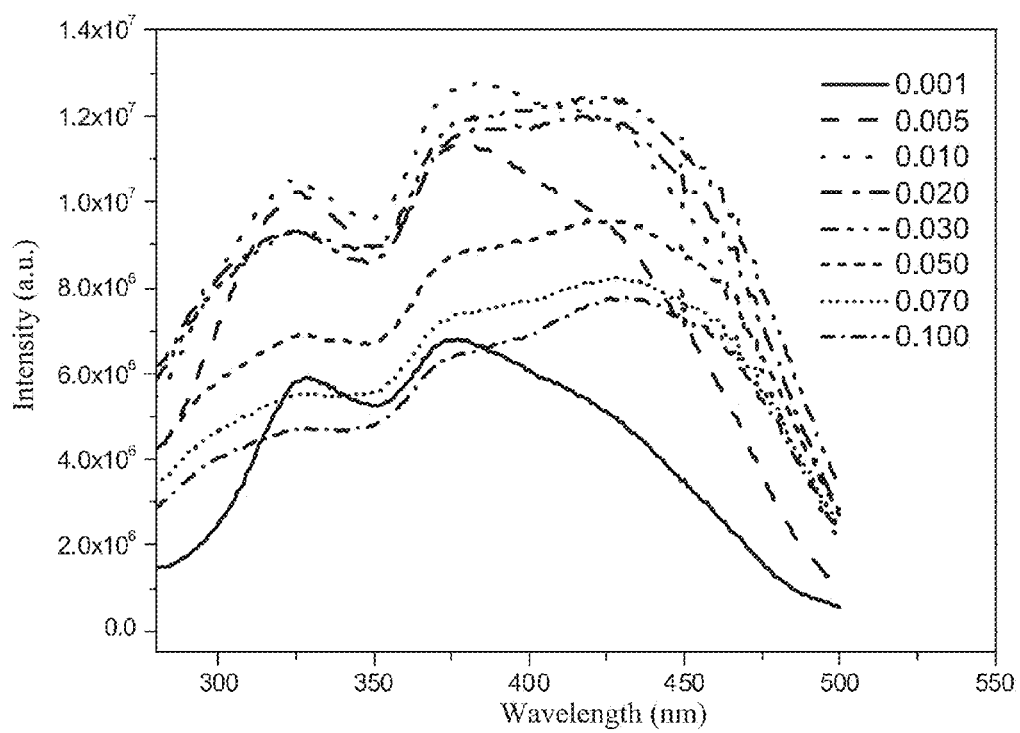
Figure 4:
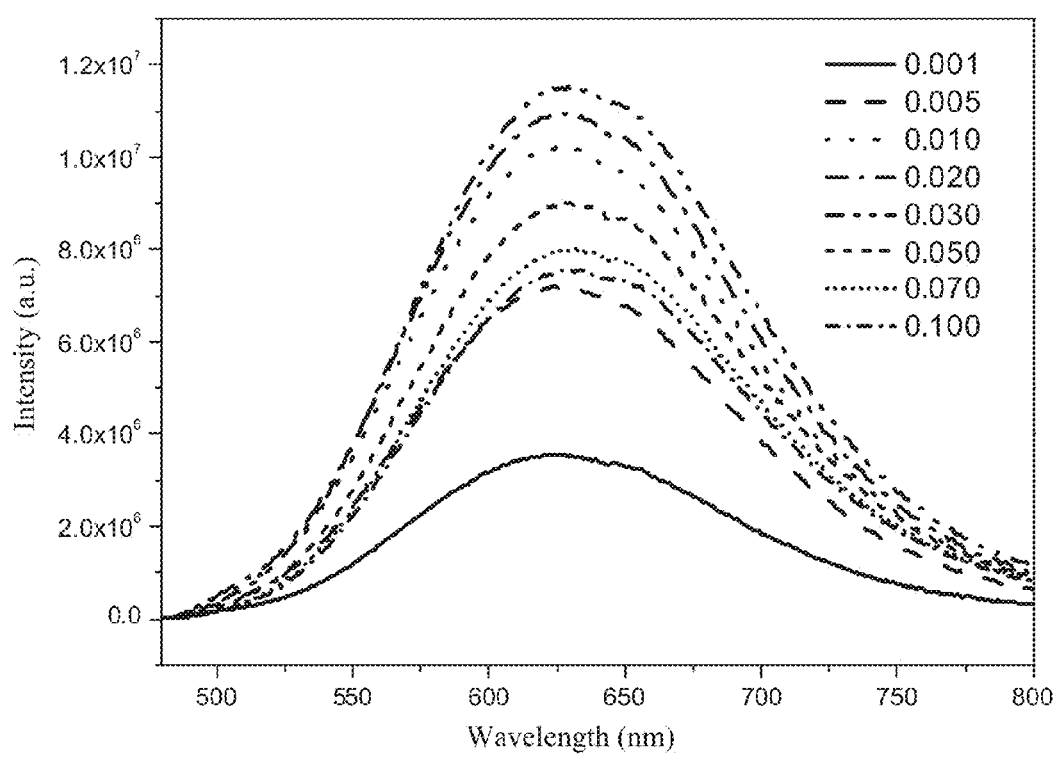
Figure 5:
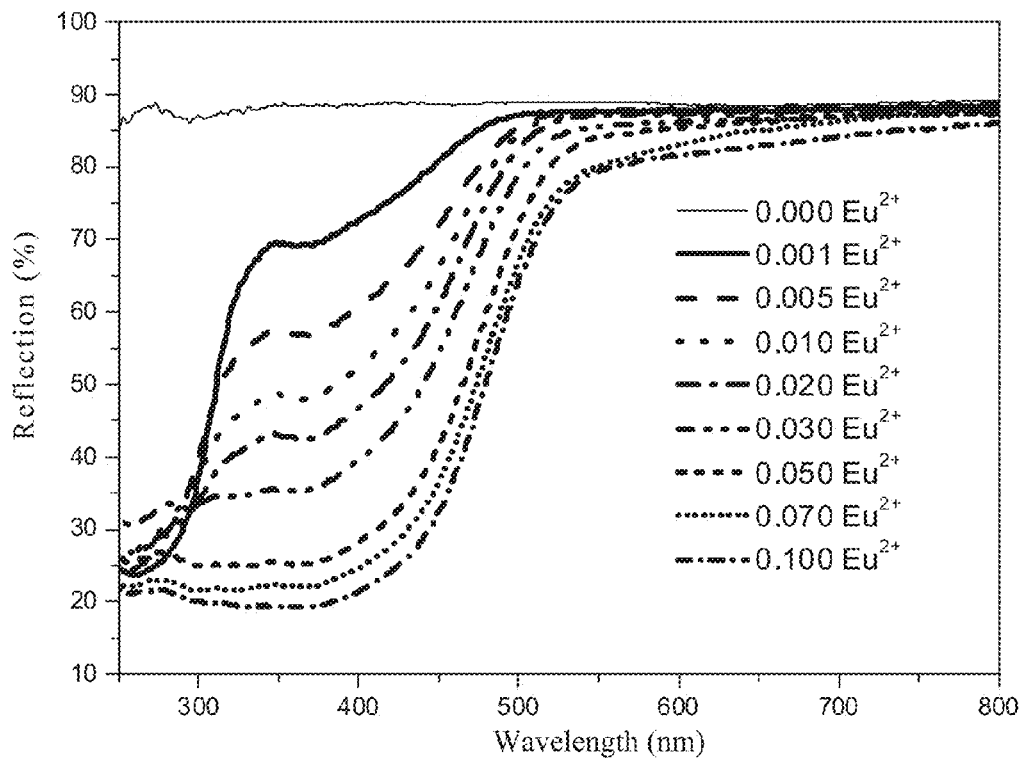

The excitation spectrum in FIG. 3 was obtained by monitoring the emission at 630 nm. From FIG. 3, it can be known that the maximum absorption of blue light at 450 nm occurs when x is 0.030 (i.e. doping amount of $Eu^{2+}$ is 3 mol %). The emission spectrum in FIG. 4 was obtained by exciting at 450 nm. From FIG. 4, it can be known that the maximum emission near 625 nm occurs when x is 0.030. From the UV-Vis diffuse reflectance spectrum in FIG. 5, it can be known that compounds of $Ca_8La_2(PO_4)_6O_2$ doped with $Eu^{2+}$ have strong absorption in the region below 500 nm. Contrarily, the undoped $Ca_8La_2(PO_4)_6O_2$ nearly does not have any absorption in the region below 500 nm.

Figure 6:
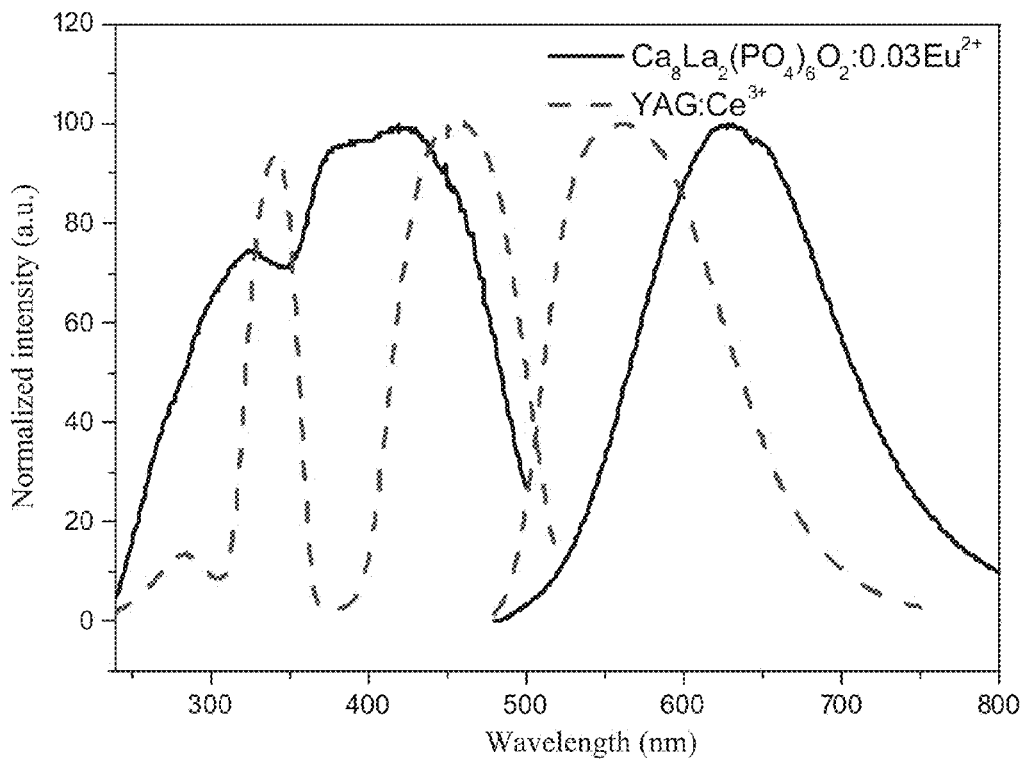
FIG. 6 is the excitation and emission spectrum of $Ca_8La_2(PO_4)_6O_2:0.03Eu^{2+}$ (depicted in solid line) and commercial yellow phosphor product of $Y_3Al_5O_{12}:Ce^{3+}$ (noted as YAG:$Ce^{3+}$, depicted in dotted line).
Figure 7A:
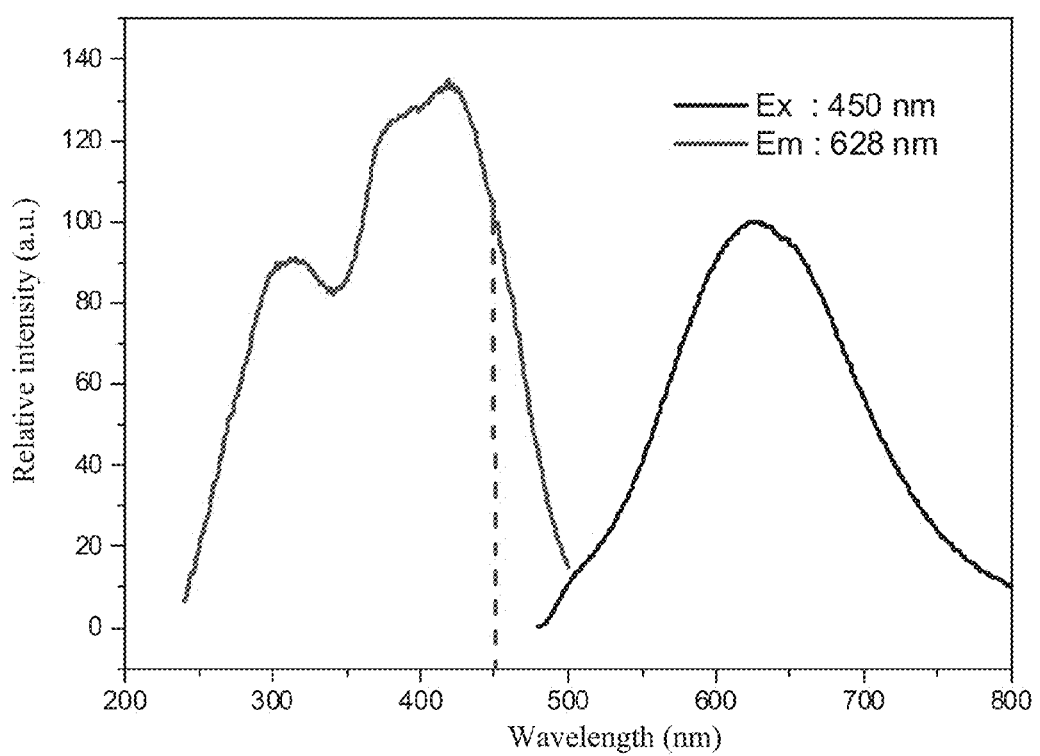
FIGS. 7A-7E are excitation and emission spectrum of Examples 1-5, respectively.
Figure 7B:
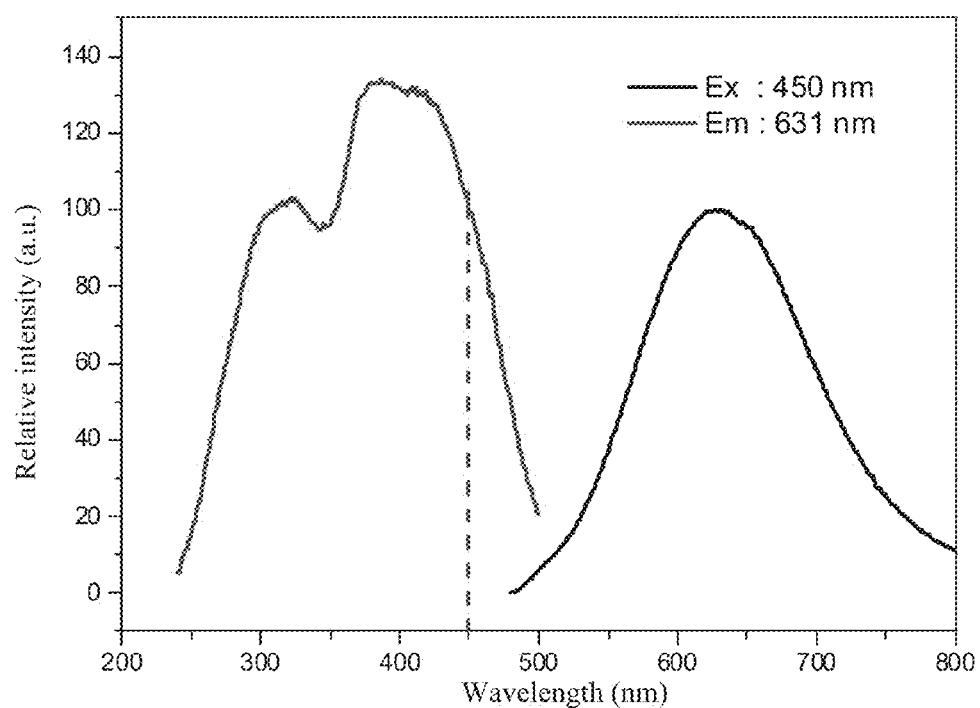
Figure 7C:
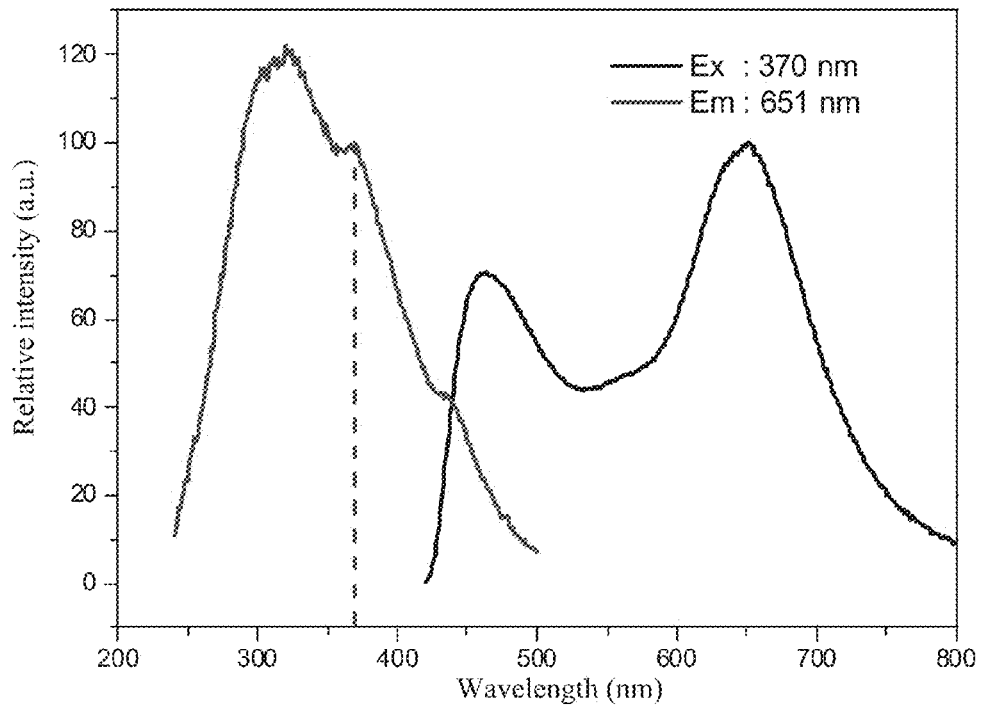
Figure 7D:
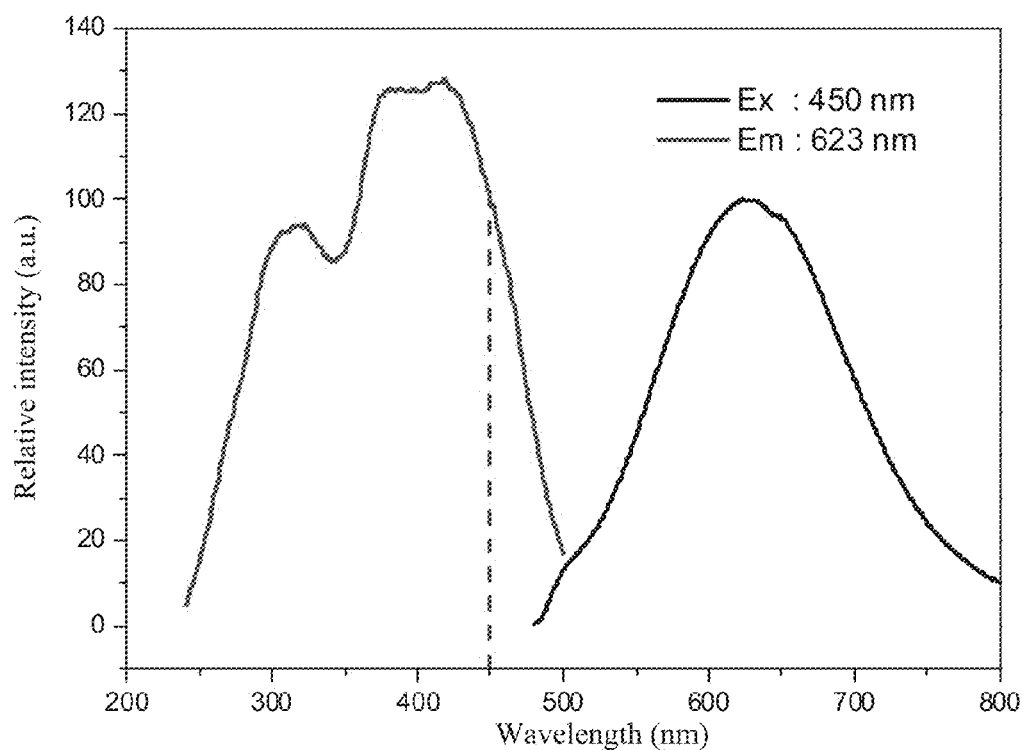
Figure 7E:
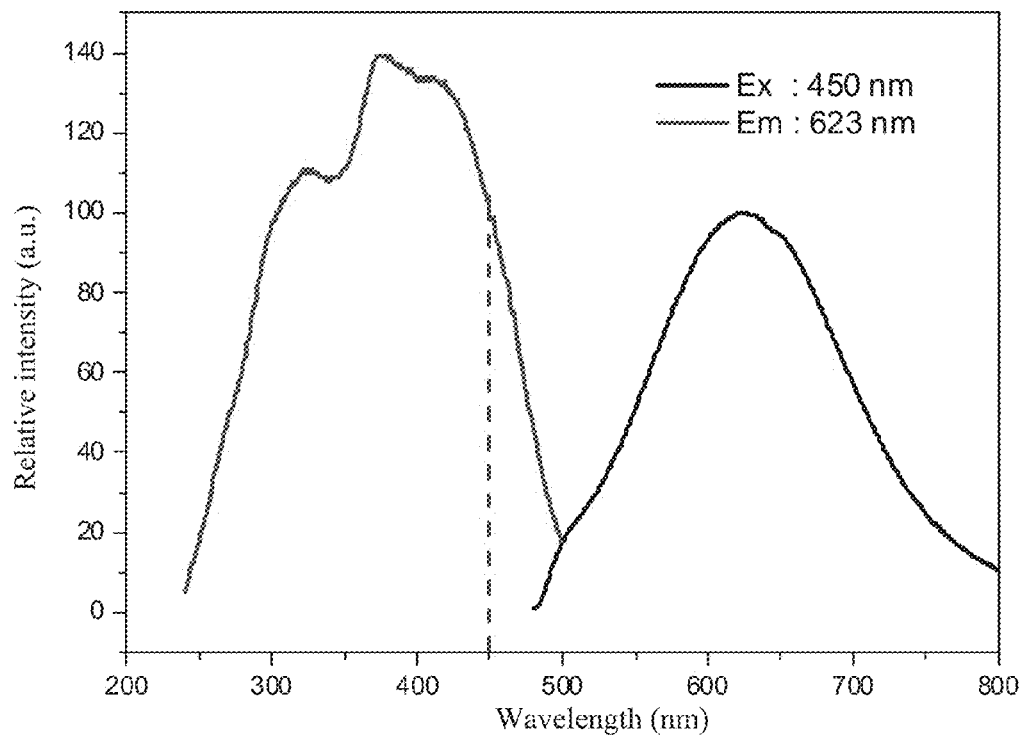
Figure 8A:
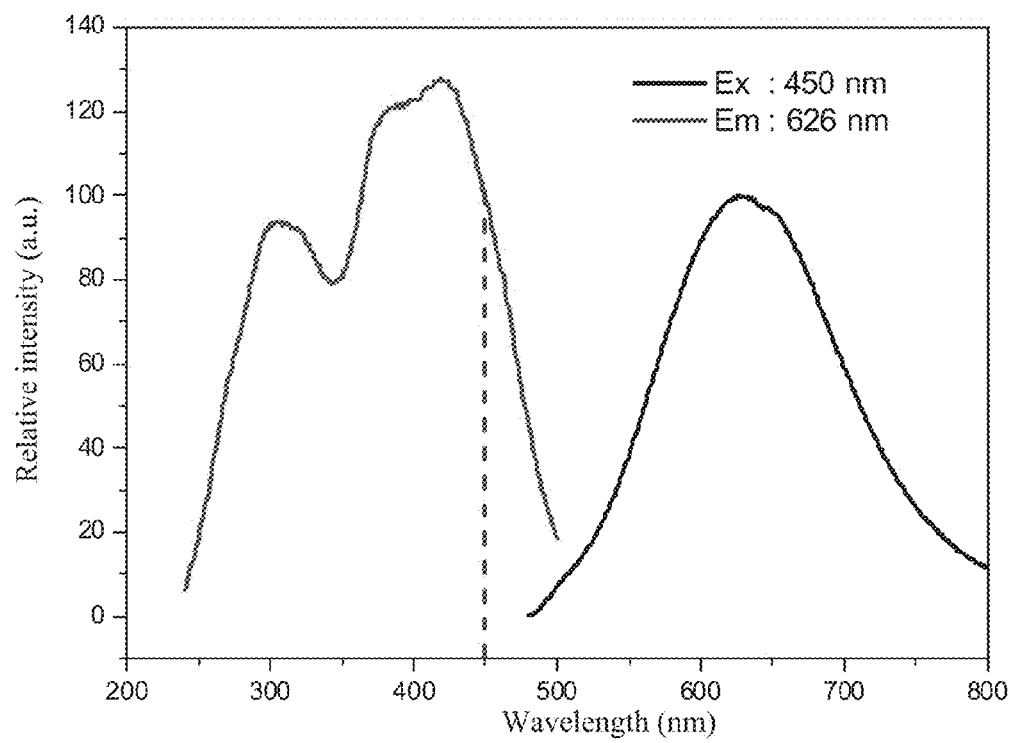
FIGS. 8A-8H are excitation and emission spectrum of Examples 6-13, respectively.
Figure 8B:
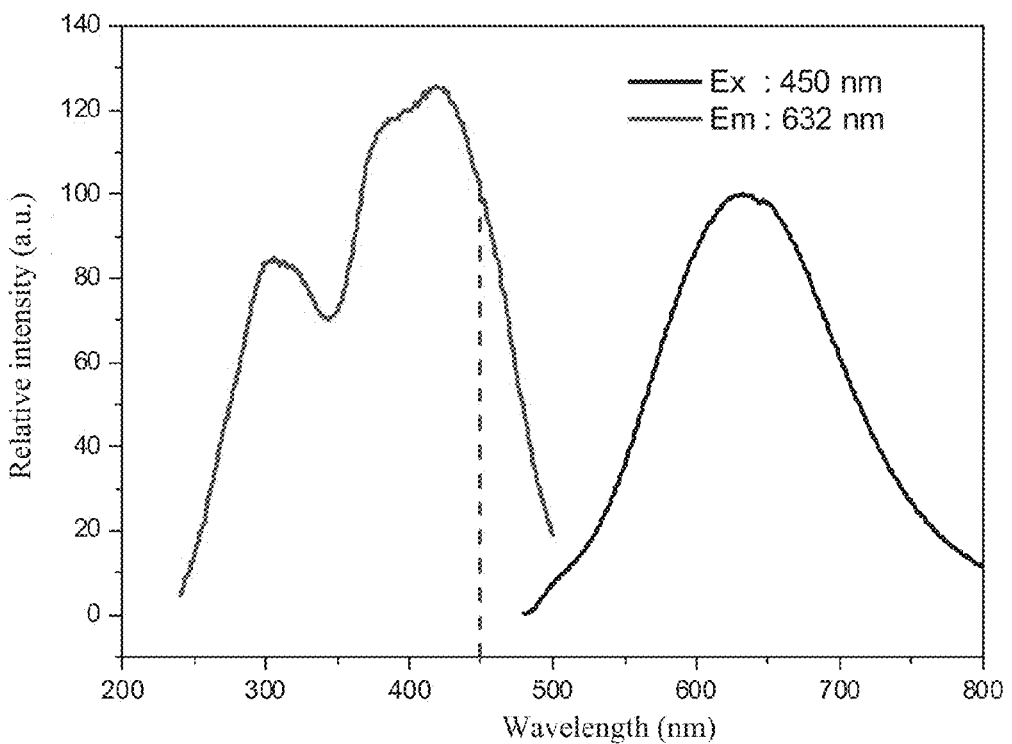
Figure 8C:
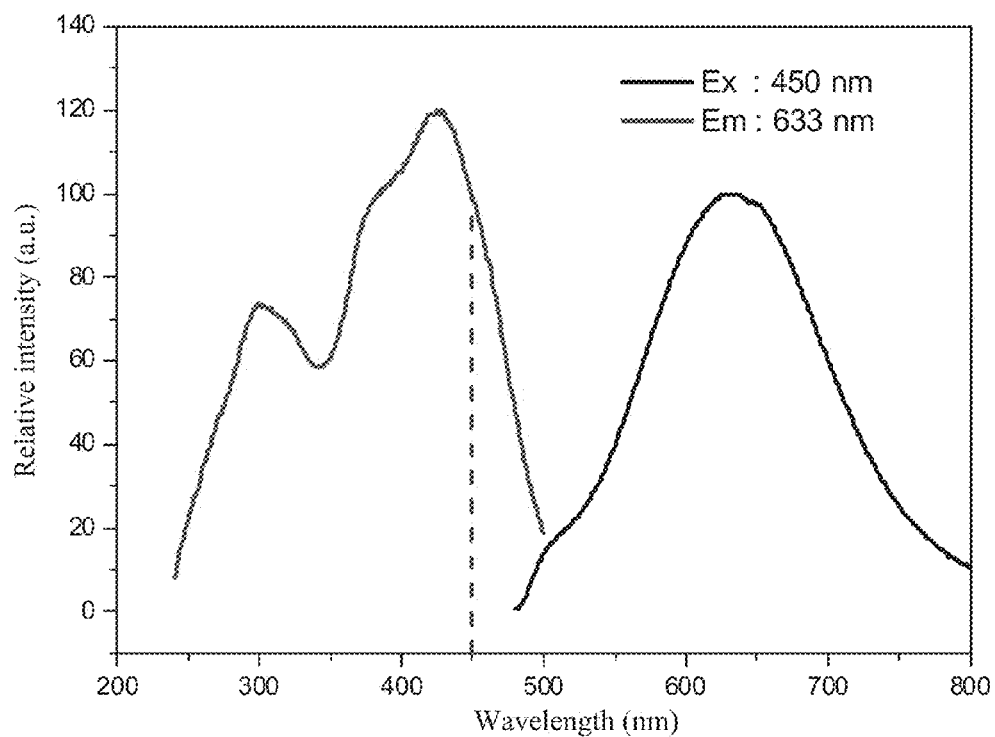
Figure 8D:
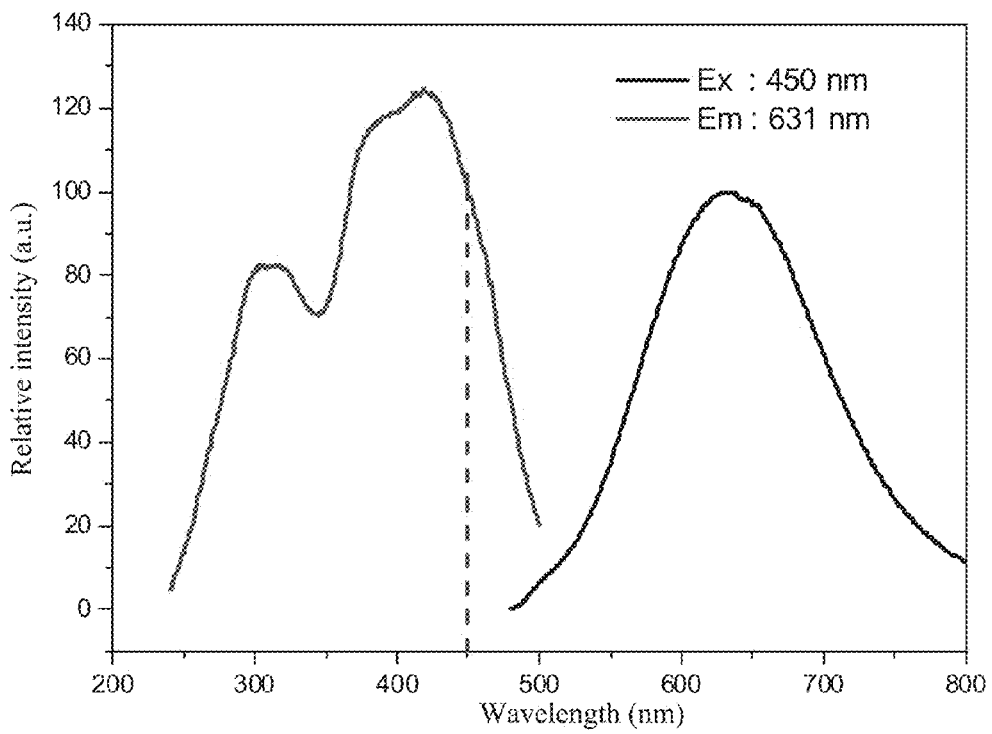
Figure 8E:
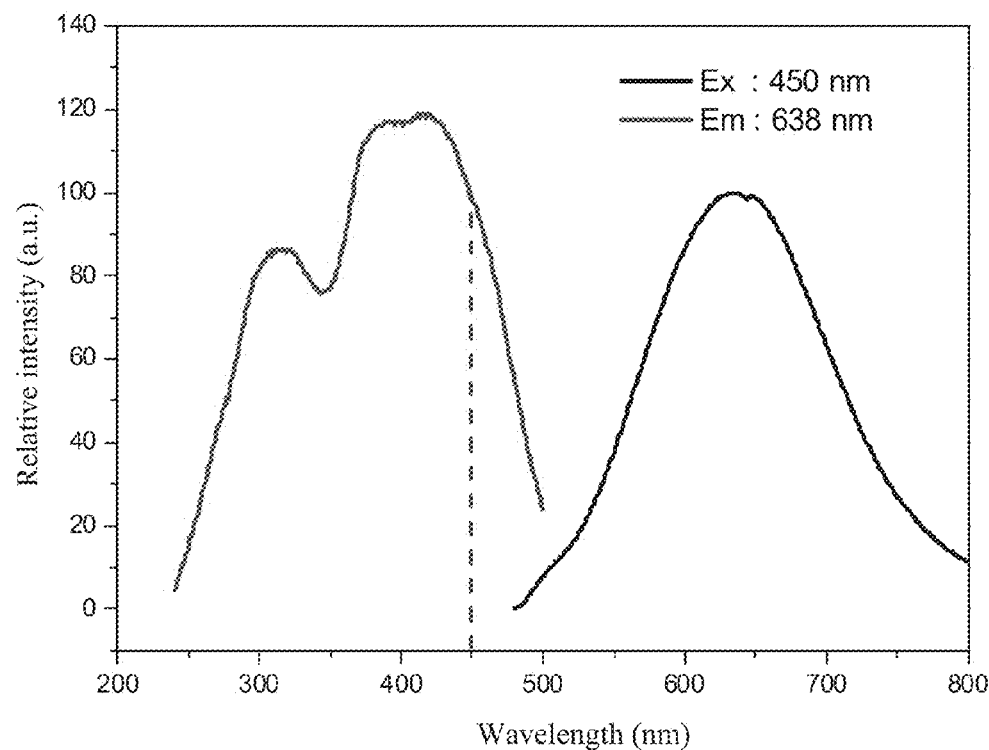
Figure 8F:
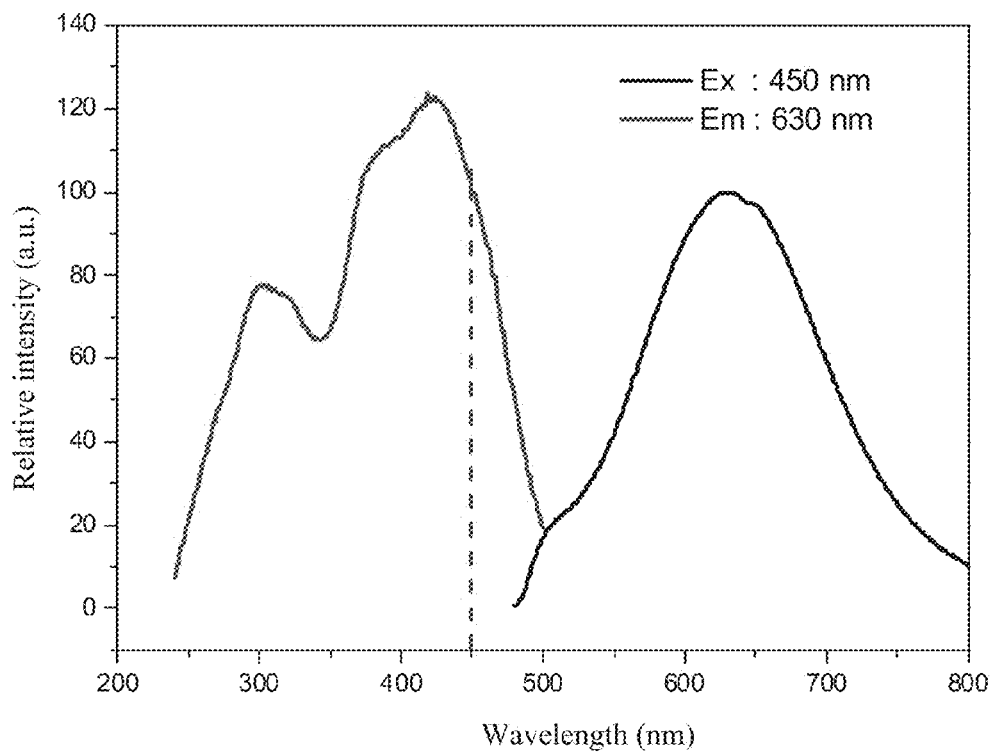
Figure 8G:
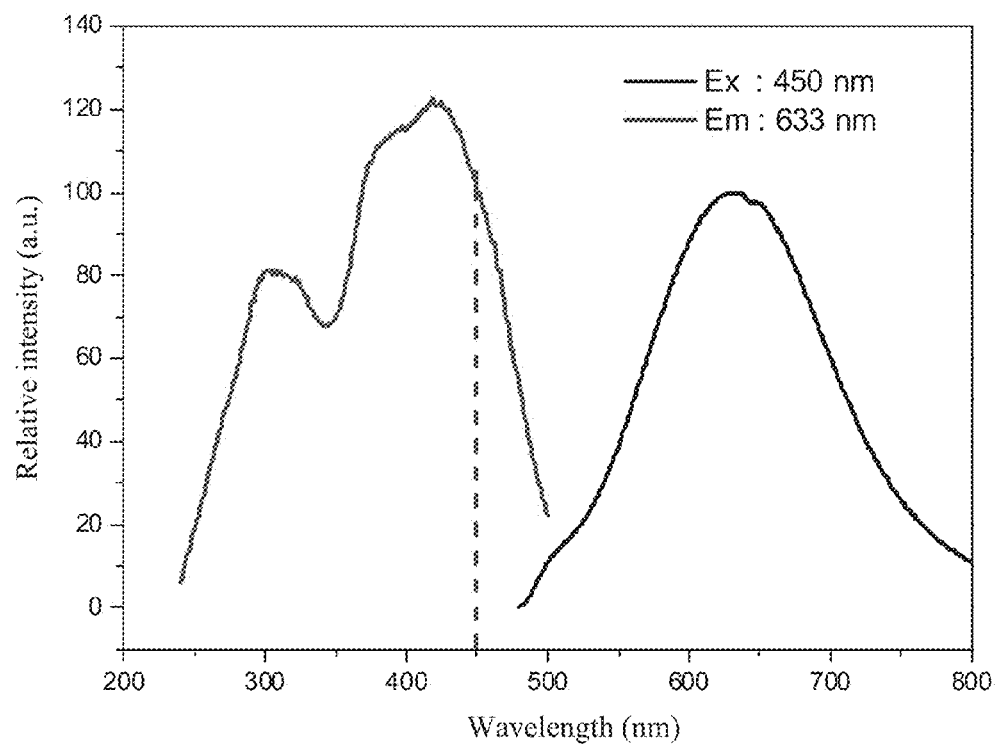
Figure 8H:
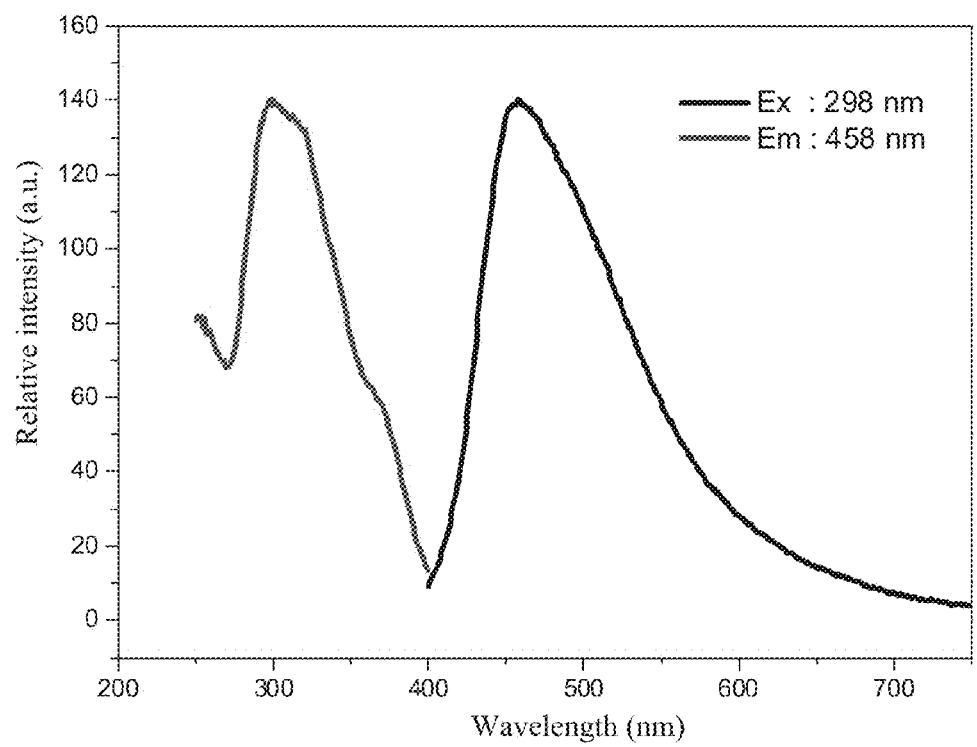

FIG. 6 is a comparison between the excitation and emission spectrum of $Ca_8La_2(PO_4)_6O_2$:$0.03Eu^{2+}$ (depicted in solid line) and commercial yellow phosphor product of $Y_3Al_5O_{12}$:$Ce^{3+}$ (noted as YAG:$Ce^{3+}$, depicted in dotted line). From FIG. 6, it can be known that $Ca_8La_2(PO_4)_6O_2$:$0.03Eu^{2+}$ has broader excitation and emission spectrum, and the emission wavelengths towards red light region. Therefore, the poor color rendition in the red light region of the conventional YAG:$Ce^{3+}$ can be resolved by this new yellow phosphor.

Embodiment 2

Synthesis of $(A_{1-x}Eu_x)_8B_2(PO_4)_6O_2$

When y=z=0, a chemical formula of $(A_{1-x}Eu_x)_8B_2(PO_4)_6O_2$ can be obtained. In the synthesized Examples of this embodiment, $A^{2+}$ included 89 mol % of $Ca^{2+}$ and 10 mol % of $Mg^{2+}$, $Sr^{2+}$, $Ba^{2+}$, $Mn^{2+}$, or $Zn^{2+}$. The doping amount of $Eu^{2+}$ was 1 mol %. $B^{2+}$ was $La^{2+}$.

Table 2 lists the 8-coordinated ionic radii of $Mg^{2+}$, $Sr^{2+}$, $Ba^{2+}$, $Mn^{2+}$ and $Zn^{2+}$, and related photoluminescence data. From Table 2, it can be known that the emission range and wavelengths are almost the same, although the ionic radii of the various $A^{2+}$ ions range from 89 pm to 142 pm. This result shows that the various $A^{2+}$ ions have little influence on the excitation and emission properties of $(Ca_{0.89}A_{0.1}Eu_{0.01})_8La_2(PO_4)_6O_2$.

FIGS. 7A-7E are excitation and emission spectrum of Examples 1-5, respectively. From the spectrum in FIGS. 7A-7E, it can be known that the excitation and emission spectrum are similar for Examples 1, 2, 4, and 5, except for $(Ca_{0.89}Mn_{0.1}Eu_{0.01})_8La_2(PO_4)_6O_2$ of Example 3. This result shows again that the various $A^{2+}$ ions have little influence on the excitation and emission properties of $(Ca_{0.89}A_{0.1}Eu_{0.01})_8La_2(PO_4)_6O_2$.

TABLE 2

Photoluminescence properties of $(Ca_{0.89}A_{0.1}Eu_{0.01})_8La_2(PO_4)_6O_2$

| Examples | Ionic radii of $A^{2+}$ (pm) | Excitation range (peak) (nm) | Emission range (peak) (nm) | CIE (x, y) |
|---|---|---|---|---|
| 1 $(Ca_{0.89}Mg_{0.1}Eu_{0.01})_8La_2(PO_4)_6O_2$ | 89 | 240-500 (450) | 480-800 (628) | (0.550, 0.441) |
| 2 $(Ca_{0.89}Zn_{0.1}Eu_{0.01})_8La_2(PO_4)_6O_2$ | 90 | 240-500 (450) | 480-800 (631) | (0.561, 0.432) |
| 3 $(Ca_{0.89}Mn_{0.1}Eu_{0.01})_8La_2(PO_4)_6O_2$ | 96 | 240-500 (370) | 420-800 (651) | (0.373, 0.329) |
| 4 $(Ca_{0.89}Sr_{0.1}Eu_{0.01})_8La_2(PO_4)_6O_2$ | 126 | 240-500 (450) | 480-800 (623) | (0.544, 0.445) |
| 5 $(Ca_{0.89}Ba_{0.1}Eu_{0.01})_8La_2(PO_4)_6O_2$ | 142 | 240-500 (450) | 480-800 (623) | (0.532, 0.454) |

Embodiment 3

Synthesis of $(A_{1-x}Eu_x)_8B_2(PO_4)_6O_2$

When y=z=0, a chemical formula of $(A_{1-x}Eu_x)_8B_2(PO_4)_6O_2$ can be obtained. In the synthesized Examples of this embodiment, $A^{2+}$ was $Ca^{2+}$, and doping amount of $Eu^{2+}$ was 1 mol %. Moreover, $B^{3+}$ included 90 mol % of $La^{3+}$ and 10 mol % of $Al^{3+}$, $Ga^{3+}$, $Sc^{3+}$, $In^{3+}$, $Lu^{3+}$, $Y^{3+}$, or $Gd^{3+}$.

Table 3 lists 6-coordinated ionic radii of $Al^{3+}$, $Ga^{3+}$, $Sc^{3+}$, $In^{3+}$, $Lu^{3+}$, $Y^{3+}$, or $Gd^{3+}$, and photoluminescence data of the synthesized Examples above. From Table 3, it can be known that the emission range and wavelengths are almost the same, although the ionic radii of the various $B^{3+}$ ions range from 53.5 pm to 103 pm. This result shows that the various $B^{3+}$ ions have little influence on the excitation and emission properties of $(Ca_{0.99}Eu_{0.01})_8(La_{0.9}B_{0.1})_2(PO_4)_6O_2$.

FIGS. 8A-8H are excitation and emission spectrum of Examples 6-13, respectively. From the spectrum in FIGS. 8A-8H, it can be known that the excitation and emission spectrum are similar for Examples 6-12, except for $(Ca_{0.99}Eu_{0.01})_8(La_{0.9}Bi_{0.1})_2(PO_4)_6O_2$ of Example 13. This result shows again that the various $B^{3+}$ ions have little influence on the excitation and emission properties of $(Ca_{0.99}Eu_{0.01})_8(La_{0.9}B_{0.1})_2(PO_4)_6O_2$.

TABLE 3

Photoluminescence properties of $(Ca_{0.99}Eu_{0.01})_8(La_{0.9}B_{0.1})_2(PO_4)_6O_2$

| | Examples | Ionic radii of $B^{3+}$ (pm) | Excitation range (peak) (nm) | Emission range (peak) (nm) | CIE (x, y) |
|---|---|---|---|---|---|
| 6 | $(Ca_{0.99}Eu_{0.01})_8(La_{0.9}Al_{0.1})_2(PO_4)_6O_2$ | 53.5 | 240-500 (450) | 480-800 (626) | (0.558, 0.435) |
| 7 | $(Ca_{0.99}Eu_{0.01})_8(La_{0.9}Ga_{0.1})_2(PO_4)_6O_2$ | 62 | 240-500 (450) | 480-800 (632) | (0.561, 0.431) |
| 8 | $(Ca_{0.99}Eu_{0.01})_8(La_{0.9}Sc_{0.1})_2(PO_4)_6O_2$ | 74.5 | 240-500 (450) | 480-800 (633) | (0.548, 0.441) |
| 9 | $(Ca_{0.99}Eu_{0.01})_8(La_{0.9}In_{0.1})_2(PO_4)_6O_2$ | 80 | 240-500 (450) | 480-800 (631) | (0.564, 0.430) |
| 10 | $(Ca_{0.99}Eu_{0.01})_8(La_{0.9}Lu_{0.1})_2(PO_4)_6O_2$ | 86.1 | 240-500 (450) | 480-800 (638) | (0.558, 0.434) |
| 11 | $(Ca_{0.99}Eu_{0.01})_8(La_{0.9}Y_{0.1})_2(PO_4)_6O_2$ | 90 | 240-500 (450) | 480-800 (630) | (0.542, 0.445) |
| 12 | $(Ca_{0.99}Eu_{0.01})_8(La_{0.9}Gd_{0.1})_2(PO_4)_6O_2$ | 93.8 | 240-500 (450) | 480-800 (633) | (0.553, 0.438) |
| 13 | $(Ca_{0.99}Eu_{0.01})_8(La_{0.9}Bi_{0.1})_2(PO_4)_6O_2$ | 103 | 240-400 (298) | 400-750 (458) | (0.214, 0.266) |

Embodiment 4

Synthesis of $(A_{1-x}Eu_x)_{8-y}B_{2+y}(PO_4)_{6-y}(SiO_4)_yO_2$

When z=0, the chemical formula of $(A_{1-x}Eu_x)_{8-y}B_{2+y}(PO_4)_{6-y}(SiO_4)_yO_2$ can be obtained. In the synthesized Example of this embodiment, $A^{2+}$ was $Ca^{2+}$, and the doping amount of $Eu^{2+}$ was 1 mol %. Moreover, $B^{3+}$ was $La^{3+}$, and y=1. Therefore, the obtained chemical formula was $(Ca_{0.99}Eu_{0.01})_7La_3(PO_4)_5(SiO_4)O_2$. The related photoluminescence properties are listed in Table 4, and the excitation and emission spectrum are shown in FIG. 9.

Figure 9:
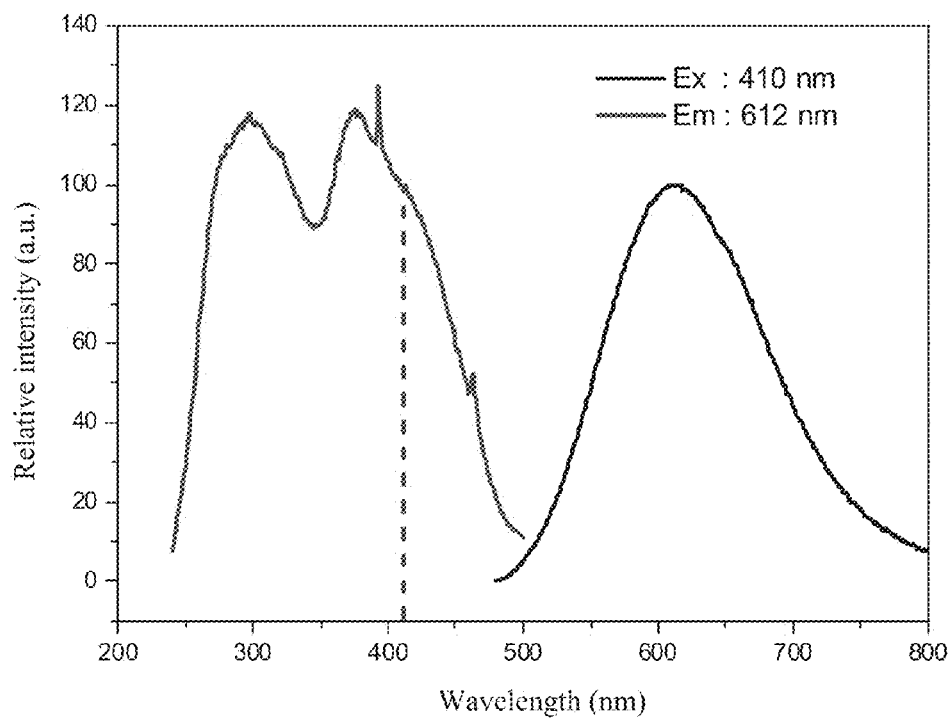
FIG. 9 is excitation and emission spectrum of Example 14.

From Table 4 and FIG. 9, it can be known that the emission data of $(Ca_{0.99}Eu_{0.01})_7La_3(PO_4)_5(SiO_4)O_2$ is similar to those of Examples 1-13 above. This result shows that the replacement of a phosphate ion by a silicate ion has little influence on the excitation and emission spectrum of these compounds.

TABLE 4

Photoluminescence properties of $(Ca_{0.99}Eu_{0.01})_7La_3(PO_4)_5(SiO_4)O_2$

| Examples | | Excitation range (peak) (nm) | Emission range (peak) (nm) | CIE (x, y) |
|---|---|---|---|---|
| 14 | $(Ca_{0.99}Eu_{0.01})_7La_3(PO_4)_5(SiO_4)O_2$ | 240-500 (410) | 480-800 (612) | (0.456, 0.448) |

Embodiment 5

Synthesis of $(A_{1-x}Eu_x)_8B_2(PO_4)_6(O_{1-z}S_z)_2$

When y=0, a chemical formula of $(A_{1-x}Eu_x)_8B_2(PO_4)_6(O_{1-z}S_z)_2$ can be obtained. In the synthesized Example of this embodiment, $A^{2+}$ was $Ca^{2+}$, and the doping amount of $Eu^{2+}$ was 1 mol %. Moreover, $B^{3+}$ was $La^{3+}$, and z=0.1. Therefore, the obtained chemical formula was $(Ca_{0.99}Eu_{0.01})_8La_3(PO_4)_6(O_{0.9}S_{0.1})_2$. The related photoluminescence properties are listed in Table 5, and the excitation and emission spectrum are shown in FIG. 10.

Figure 10:
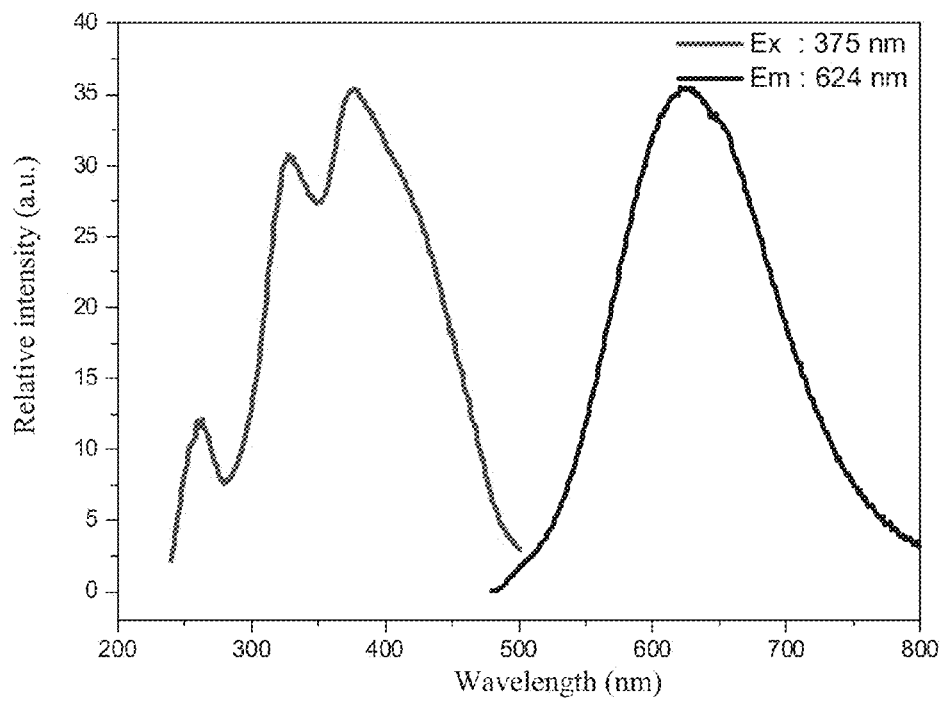
FIG. 10 is excitation and emission spectrum of Example 15.

From Table 5 and FIG. 10, it can be known that the emission data of $(Ca_{0.99}Eu_{0.01})_8La_3(PO_4)_6(O_{0.9}S_{0.1})_2$ is similar to those of Examples 1-13 above. This result shows that the replacement of an $O^{2-}$ ion by a $S^{2-}$ ion has little influence on the excitation and emission spectrum of these compounds.

TABLE 5

Photoluminescence properties of $(Ca_{0.99}Eu_{0.01})_8La_3(PO_4)_6(O_{0.9}S_{0.1})_2$

| Examples | | Excitation range (peak) (nm) | Emission range (peak) (nm) | CIE (x, y) |
|---|---|---|---|---|
| 14 | $(Ca_{0.99}Eu_{0.01})_8La_3(PO_4)_6(O_{0.9}S_{0.1})_2$ | 240-500 (375) | 480-800 (624) | (0.568, 0.427) |

Embodiment 6

Application of $(Ca_{0.97}Eu_{0.03})_8La_2(PO_4)_6O_2$ on WLEDs

Figure 11:
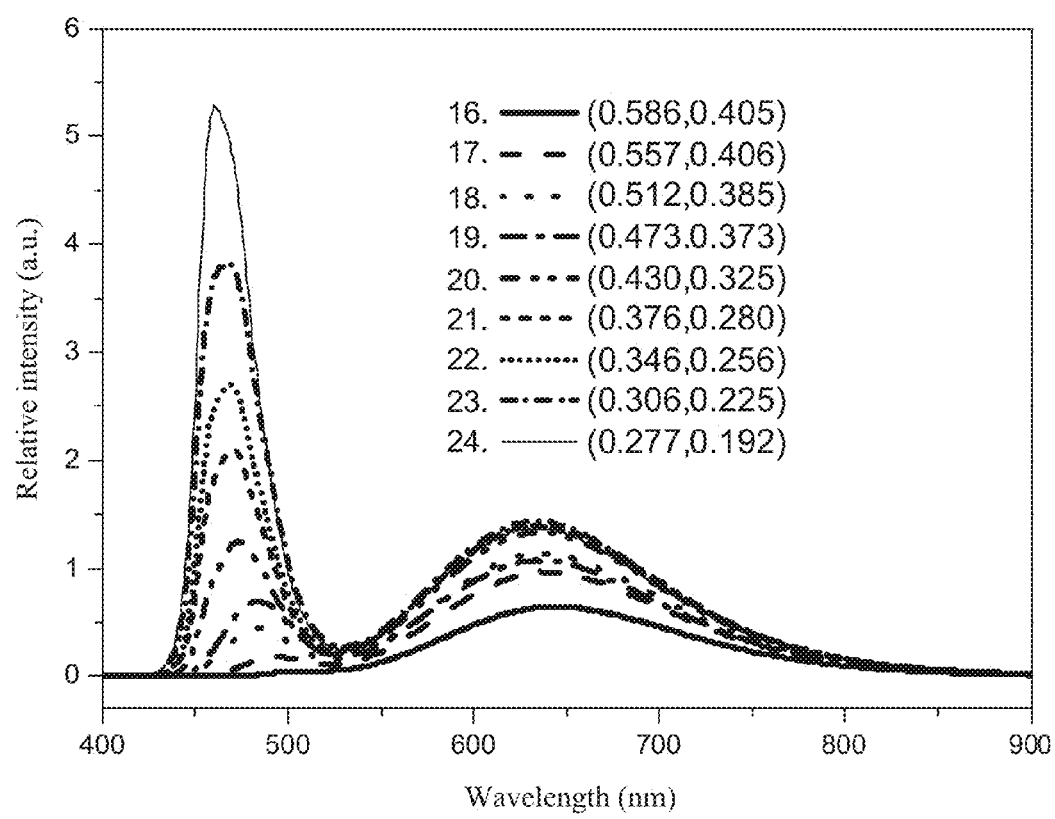
FIG. 11 is the emission spectrum of the obtained WLEDs of Examples 16-24.

In this embodiment, an InGaN blue light chip capable of emitting 460 nm was used, and various concentrations of $(Ca_{0.97}Eu_{0.03})_8La_2(PO_4)_6O_2$ were doped in the sealant of the chip to form a white-light emitting diode (WLED). The doping concentrations and related CIE values of the obtained WLEDs are listed in Table 6, and the emission spectrum of the obtained WLEDs are shown in FIG. 11.

TABLE 6

The doping concentrations and related CIE values of the obtained WLEDs

| Examples | Doping concentration (wt %) | CIE (x, y) |
|---|---|---|
| 16 | 50 | (0.586, 0.405) |
| 17 | 45 | (0.557, 0.406) |
| 18 | 40 | (0.512, 0.385) |
| 19 | 35 | (0.473, 0.325) |
| 20 | 30 | (0.430, 0.325) |
| 21 | 25 | (0.376, 0.280) |
| 22 | 20 | (0.346, 0.256) |
| 23 | 15 | (0.306, 0.225) |
| 24 | 10 | (0.277, 0.192) |

From Table 6 and FIG. 11, it can be known that when the doping concentration of $(Ca_{0.97}Eu_{0.03})_8La_2(PO_4)_6O_2$ in the sealant decreased, the emitted blue light intensity near 460 nm was increased and the emitted yellow light intensity near 625 nm was decreased. Therefore, the CIE value of the WLEDs can be changed from (0.586, 0.405) of orange yellow light to (0.277, 0.192) of cold white light for Examples 16-24.

In summary, the main emission range of the yellow phosphors having oxyapaptite structure above has longer wavelengths and thus towards red light region. Therefore, using the yellow phosphors above to produce WLEDs can improve the color rendition property of the emitted white light to gain a better quality of white light.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series of equivalent or similar features.

What is claimed is:

1. A yellow phosphor having oxyapatite structure and a chemical formula of $(A_{1-x}Eu_x)_{8-y}B_{2+y}(PO_4)_{6-y}(SiO_4)_y(O_{1-z}S_z)_2$, wherein A and Eu are divalent metal ions, B is a trivalent metal ion, $0<x\leq0.6$, $0\leq y\leq6$, and $0\leq z\leq1$, and wherein A is Mg, Sr, a rare earth metal, or Zn, and B is a group 13 metal, Bi, Sc, Y, Ce, Pr, Nd, Pm, Sm, Eu, Gd, Tb, Dy, Ho, Er, Tm, Yb, or Lu.

2. The yellow phosphor of claim 1, wherein the chemical formula is $(A_{1-x}Eu_x)_8B_2(PO_4)_6O_2$ when both y and z are zero.

3. The yellow phosphor of claim 1, wherein the chemical formula is $(A_{1-x}Eu_x)_2B_8(SiO_4)_6O_2$ when y is 6 and z is zero.

4. The yellow phosphor of claim 1, wherein the chemical formula is $(A_{1-x}Eu_x)_8B_2(PO_4)_6S_2$ when y is zero and z is 1.

5. The yellow phosphor of claim 1, wherein the chemical formula is $(A_{1-x}Eu_x)_2B_8(SiO_4)_6S_2$ when y is 6 and z is 1.

6. The yellow phosphor of claim 1, wherein the rare earth metal is Sc, Y or a lanthanoid.

7. The yellow phosphor of claim 1, wherein the group 13 metal is Al, Ga, or In.

8. A white-light emitting diode (WLED), comprising:
a blue phosphor; and
the yellow phosphor of claim 1.

9. The WLED of claim 8, wherein the rare earth metal is Sc, Y or a lanthanoid.

10. The WLED of claim 8, wherein the group 13 metal is Al, Ga, or In.

11. A method of preparing the yellow phosphor of claim 1, the method comprising:
   weighing stoichiometric amounts of raw materials for required elements of the yellow phosphor, wherein the raw materials of the metals in the yellow phosphor is metal oxide or metal carbonate, the raw material of the phosphate in the yellow phosphor is $(NH_4)_2HPO_4$ or $(NH_4)H_2PO_4$, the raw material of the silicate in the yellow phosphor is silicon oxide, and the raw material of the sulfur in the yellow phosphor is sulfur powder;
   uniformly mixing the weighed raw materials;
   calcining the mixed raw materials in an environment containing oxygen at a temperature of 1200-1400° C. until a product having a pure oxyapatite phase is obtained; and
   reducing $Eu^{3+}$ of the calcined product to $Eu^{2+}$ in an $NH_3$ atmosphere at a temperature of 900-1200° C. to obtain the yellow phosphor of claim 1.

12. The method of claim 11, further comprising homogenizing the calcined product before the reducing step.

\* \* \* \* \*